United States Patent
Hosoi

(10) Patent No.: US 7,243,848 B2
(45) Date of Patent: Jul. 17, 2007

(54) OPTICAL MODULE WITH ACCELERATED RESET CAPABILITY

(75) Inventor: Kazukuni Hosoi, Kawaguchi (JP)

(73) Assignees: Optoelectronics Co. Ltd., Saitama Pref. (JP); Cypress Semiconductor Corporation, San Jose, CA (US)

(*) Notice: Subject to any disclaimer, the term of this patent is extended or adjusted under 35 U.S.C. 154(b) by 73 days.

(21) Appl. No.: 11/183,557

(22) Filed: Jul. 18, 2005

(65) Prior Publication Data
US 2007/0012780 A1    Jan. 18, 2007

(51) Int. Cl.
*G06K 9/22* (2006.01)
(52) U.S. Cl. .............. 235/462.25; 235/462.01
(58) Field of Classification Search ........... 235/462.25, 235/462.01, 462.09, 462.1
See application file for complete search history.

(56) References Cited

U.S. PATENT DOCUMENTS 5,756,981 A * 5/1998 Roustaei et al. ....... 235/462.42
5,821,518 A * 10/1998 Sussmeier et al. ..... 235/462.01
6,141,046 A * 10/2000 Roth et al. ................. 348/251

FOREIGN PATENT DOCUMENTS

| JP | 60-65383 A | 4/1985 |
| JP | 3-25585 A | 2/1991 |
| JP | 11-316794 A | 11/1999 |
| JP | 2003-30577 A | 1/2003 |
| JP | 2003-337941 A | 11/2003 |

OTHER PUBLICATIONS

Int'l Search Report & Written Opinion, Dec. 27, 2005.

* cited by examiner

*Primary Examiner*—Daniel St. Cyr
(74) *Attorney, Agent, or Firm*—Kaplan Gilman Gibson & Dernier LLP

(57) ABSTRACT

An optical scanning system in which plural scan lines are sequentially scanned, and parameters association with the scanning are monitored. If one or more parameters change during the scanning operation, the system automatically begins rescanning, rather than continuing to scan the entire frame. This results in a system that operates more quickly than prior art systems, which have to waste an entire frame.

11 Claims, 1 Drawing Sheet

OPTICAL MODULE WITH ACCELERATED RESET CAPABILITY

TECHNICAL FIELD

This invention relates to optical scanning systems, and more specifically, to an improved technique of scanning, reading, and interpreting one or two dimensional symbols, such as barcode symbols and the like. The invention has particular applicability to systems wherein plural items such as packages are moving through a conveyor belt and are scanned in sequence.

BACKGROUND OF THE INVENTION

One and two dimensional symbols, such as barcodes and the like, have become commonplace in modern day society. Such symbols are utilized everywhere from supermarket scanners to postal delivery systems, and in a variety of other fields. In inventory, factory, and other systems, it is often the case that a conveyor belt includes a variety of items that are moved through the field of view of a scanner, so that such items can be counted, inventoried, or processed in some other way.

Such systems, it is important that the symbol to be read, which is usually placed on the side of a package or other reading surface, be quickly read by the scanning system because the items are moving through the field of view relatively quickly. If the scanning system takes too long to read the symbol, the symbol may completely pass the scanning system before the reading operation is complete. This will cause items to be miscounted and the system could not function properly. In most other applications, reading the symbol as quickly as possible is important, a problem increased by the fact that in two dimensional symbols, the lines are usually scanned sequentially.

Another problem with such systems is that ambient conditions, such as lighting conditions and shutter speed used for reading the symbol may change. Such changes may require adjustments to parameters within the optical reading system, such as the integration time. If the adjustment occurs during the reading of a frame, the entire frame must be discarded because it contains mixed data gathered at two different shutter speeds.

It is an object of the invention to provide a system wherein scanning can be accomplished and any changes made quickly enough so that both one of two dimensional barcodes, and other optical symbols, can be read efficiently enough to allow for the foregoing changes to occur.

It is another object of the invention to ensure that a two dimensional symbol is not read in a manner that requires frames to be discarded because conditions changed in the middle of reading the frame.

SUMMARY OF THE INVENTION

The above and other problems are solved in accordance with an exemplary embodiment of the present invention. Symbols to be read are scanned line by line, and changing parameters are monitored. If parameters, such as the lighting conditions and shutter speed, are changed during the scanning of a particular frame, then an immediate reset is triggered to cause the system to begin scanning the first scan line of the frame again. This avoids scanning the remainder of the scan lines of the symbol during the frame in which the shutter speed has changed, and hence, avoids frame which would have two different shutter speeds, and thus, have to be discarded anyway.

DETAILED DESCRIPTION OF THE PREFERRED EMBODIMENT

Figure 1:
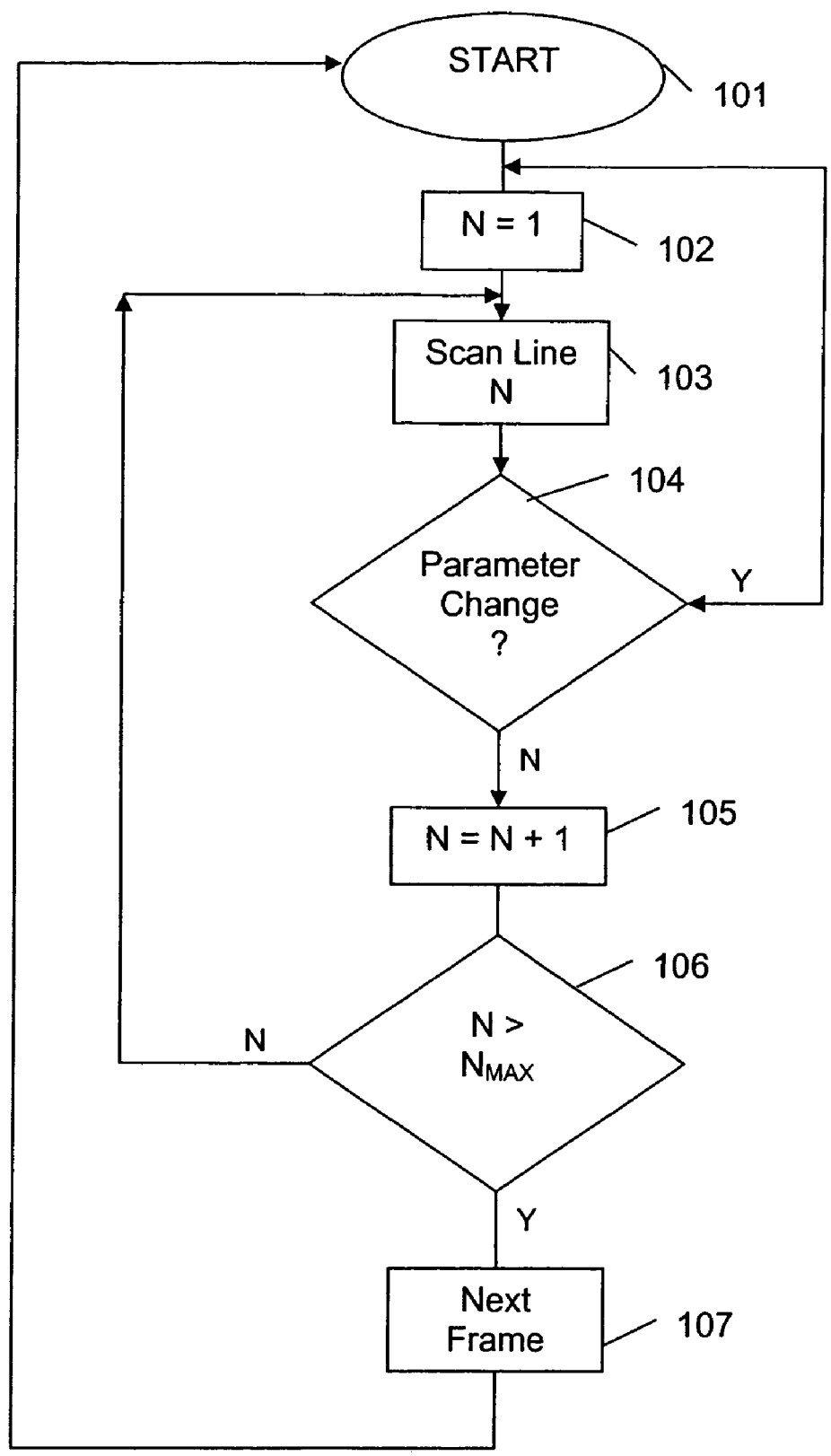
FIG. 1 is a flowchart of a method in accordance with an exemplary embodiment of the present invention.

FIG. 1 depicts a flowchart setting forth an exemplary embodiment of the present invention. For purposes of discussion herein, we presume that a parameter change may occur during a particular scanning of a symbol is the shutter speed of the scanner, which results from a change in ambient lighting conditions or other factors. However, it is understood that the present invention is not limited to this particular parameter, and that any other parameters may be monitored and may change during a frame time as well.

Additionally, for purposes of explanation, we assume that a two-dimensional barcode is the symbol being scanned and interpreted. However, it is also understood that any symbol, including one and two dimensional symbols, may be utilized in connection with the techniques of the present invention.

Turning to the flowchart of FIG. 1, the system begins at START 101 and the index parameter N=1 at block 102. At block 103, the scan line and the two-dimensional image is scanned, which for the first time through the loop, will be the first scan line.

Control is then transferred to decision point 104, where a test is done to determine whether the parameter that may effect the system operation has changed. In the present example, that parameter is the shutter speed. If the shutter speed is changed by the time the first scan line is completely scanned, then continuing to scan the remaining lines of the 2 dimensional symbol will result in a frame that has scan lines of different shutter speeds, which will have to be discarded. Accordingly, at decision point 104, if the shutter speed has changed during the particular frame at issue, the scanning process will begin all over at line 1 by returning to block 102 and resetting N=1.

If no change in shutter speed occurs during the frame, N is incremented at block 105 so that the next scan line will be scanned. Then, at decision point 106, if the system has not already scanned the last scan line of the symbol, control is returned to block 103 so that the next scan line can be scanned. Otherwise, the frame is complete and the system increments to the next frame at block 107, then setting N=1 and beginning the process anew.

In accordance with the above, if the shutter speed, or more generally, whatever other parameter is chosen, changes during the scanning of a frame, then the scanning process may be immediately reset, and the additional time required to scan the remaining lines is avoided.

The foregoing describes only the preferred embodiment of the invention, but various other modifications will be apparent to those of skill in the art. The foregoing is intended to be exemplary only, and not by way of limitations.

The invention claimed is:

1. A method of reading an image comprising:
   sequentially scanning plural lines of said image, each line being scanned at a shutter speed;
   adjusting the shutter speed, the shutter speed being adjustable based upon ambient conditions;
   upon determining that the shutter speed has changed during the scan of the image, stopping the scan of the image, and beginning scanning of a first line of the image again substantially automatically.

2. The method of claim 1 wherein said shutter speed is adjusted by monitoring an amount of ambient light and providing a feedback loop that automatically adjusts said shutter speed and also resets said scanning process to begin sequentially scanning again substantially immediately upon said adjustment of said shutter speed.

3. The method of claim 2 wherein said image is a one or two dimensional bar code symbol.

4. The method of claim 3 wherein said image is a two dimensional bar code symbol.

5. Apparatus for reading symbols comprising:
 a sensor for detecting changing ambient conditions and for causing, in response to said changing conditions, changes in integration time associated with capturing an image, and
 a scanner operable to scan the image line by line; and operable to: stop the scan of the image, and begin scanning a first line of the image again substantially immediately if the integration time changes during the scan of the image.

6. The apparatus of claim 5 wherein said changing conditions are changing lighting conditions.

7. The apparatus of claim 6 wherein the operability to stop the scan of the image comprises stopping the scan before the next full scan line is scanned.

8. A method of reading an image comprising:
 scanning lines of the image using a shutter speed;
 adjusting the shutter speed based on at least one ambient condition; and
 upon determining that the shutter speed has changed during the scan of the image,
 stopping the image; and
 substantially automatically beginning scanning the image again, at a first line thereof.

9. The method of claim 8 wherein the at least one ambient condition includes ambient light.

10. The method of claim 8 wherein the image includes at least one one-dimensional bar code symbol.

11. The method of claim 8 wherein the image includes at least one two-dimensional bar code symbol.

\* \* \* \* \*